(12) United States Patent
Toba et al.

(10) Patent No.: US 6,450,567 B2
(45) Date of Patent: Sep. 17, 2002

(54) STRUCTURE OF REAR PORTION OF AUTOMOTIVE VEHICLE BODY

(75) Inventors: Ryuichi Toba, Yokohama; Atsushi Hanyu, Yokosuka, both of (JP)

(73) Assignee: Nissan Motor Co., Kanagawa-ken (JP)

( * ) Notice: Subject to any disclaimer, the term of this patent is extended or adjusted under 35 U.S.C. 154(b) by 0 days.

(21) Appl. No.: 09/797,736

(22) Filed: Mar. 5, 2001

(30) Foreign Application Priority Data

Mar. 10, 2000 (JP) ........................................ 2000-066534

(51) Int. Cl.⁷ .............................. B60J 7/00; B60K 37/00; B60N 2/06; B60N 3/00; B60R 27/00
(52) U.S. Cl. ..................... 296/197; 296/195; 296/196
(58) Field of Search ................................ 296/189, 195, 296/196, 197, 203.04

(56) References Cited

U.S. PATENT DOCUMENTS 4,533,172 A * 8/1985 Oliver 5,882,064 A * 3/1999 Emmons

FOREIGN PATENT DOCUMENTS

| DE | 2 253 603 | * 5/1974 |
| FR | 1 048 875 | * 8/1953 |
| JP | 10-129533 | 5/1998 |

* cited by examiner

*Primary Examiner*—Joseph D. Pape
*Assistant Examiner*—Scott Carpenter
(74) *Attorney, Agent, or Firm*—McDermott, Will & Emery (57) ABSTRACT

A rear body of an automotive vehicle which includes three parts: a front body structural element, an intermediate body structural element, and a rear body structural element which are made of casts and joined together. The rigidity of the rear body is increased from the rear body structural element to the front body structural element, thereby facilitating the ease of a collapse of the rear body structural element in response to input of a rear-end collision impact for ensuring a protective structural area at a front side of the rear body.

16 Claims, 7 Drawing Sheets

FIG.11

STRUCTURE OF REAR PORTION OF AUTOMOTIVE VEHICLE BODY

BACKGROUND OF THE INVENTION

1 Technical Field

The present invention relates generally to an improved structure of a rear portion of an automotive vehicle body.

2 Background Art

Japanese Patent First Publication No. 10-129533 shows a rear body of a vehicle in which a reinforcement member is installed diagonally to connect an end portion of each rear side member to an end portion of a rear cross member across a joint of them to increase the torsional rigidity of the rear portion of the vehicle body, thereby distributing the energy of an impact force upon occurrence of a rear-end collision of the vehicle to the rear side members, the rear cross member, and rear wheel houses so as to define an impact absorbing structural portion occupying a portion of the vehicle body in front of the reinforcement members and a vehicle body deformable portion occupying the remaining portion of the vehicle body on the rear side of the reinforcement members.

Specifically, the above vehicle body structure is designed to absorb the energy of an impact force produced by a rear-end collision of the vehicle through structural members such as the rear side members arranged at a lower portion of the vehicle body and thus encounters the drawback in that it is very difficult to distribute the energy of the impact force up to an upper portion of the vehicle body effectively. Further, since the lower portion of the vehicle body absorbs the energy of the impact force as a whole, the need may arise for reconditioning or replacing the whole rear portion of the vehicle body.

SUMMARY OF THE INVENTION

It is an object of the present invention to provide an improved structure of a rear portion of an automotive vehicle body which is designed to absorb the energy of impact produced by a vehicle collision through both an upper and a lower portion of the vehicle body.

According to one aspect of the invention, there is provided a rear body of an automotive vehicle which comprises: a front body structural element made of a cast defining a front portion of the rear body; and a rear body structural element made of a cast. The rear body structural element is joined to said front body structural element to define a rear portion of the rear body and has a rigidity smaller than that of the front body structural element.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
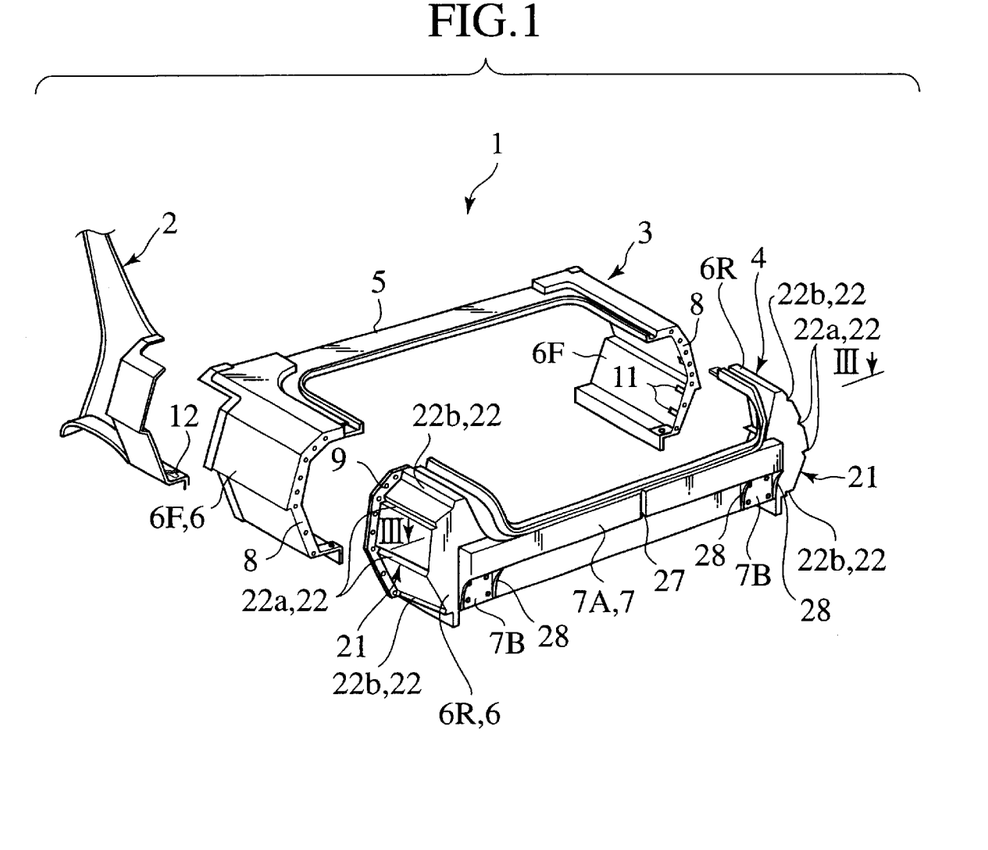
FIG. 1 is an exploded perspective view which shows a rear body of an automotive vehicle according to the first embodiment of the invention.

Referring now to the drawings, wherein like numbers refer to like parts in several views, particularly to FIGS. 1, there is shown an improved structure of a rear portion of an automotive vehicle body according to the invention A rear body 1 is made of a lightweight metallic material such as aluminum alloy and has three parts: a front body structural element 2, an intermediate body structural element 3, and a rear body structural element 4 which are arrayed longitudinally of a vehicle body. The front body structural element 2 forms body side inners. The intermediate body structural element 3 includes a rear parcel 5 and a front portion 6F of each rear fender inner 6. The rear body structural element 4 includes a rear portion 6R of each of the rear fender inners 6 and a rear end panel 7. In the following discussion, the front portions 6F and the rear portions 6R of the rear fender inners 6 will be referred to as a rear fender inner of the intermediate body structural element 3 and a rear fender inner of the rear body structural element 4, respectively.

The rear body structural element 4 is lower in rigidity than the intermediate body structural element 3. The rear body structural element 4 is smaller in lateral cross section than the intermediate body structural element 3. The rear body structural element 3 decreases gradually in lateral cross section toward the rear end panel 7. The wall thickness of the rear body 1 increases from the rear body structural element 4 to the intermediate body structural element 3 and to the front body structural element 2, thereby increasing the rigidity of the rear body 1 gradually from the rear body structural element 4 to the front body structural element 2.

The intermediate body structural element 3 has flanges 8 formed on the rear fender inners 6F. Similarly, the rear body structural element 4 has flanges 9 formed on the rear fender inner 6R. The intermediate body structural element 3 and the rear body structural element 4 are joined to each other, as clearly shown in FIG. 3, by connecting the flanges 8 and 9 together through fastening members 10 such as rivets.

The rear body structural element 4 is, as discussed above, smaller in lateral cross section thereof than the intermediate body structural element 3. The flange 9 of the rear body structural element 4 is bent outward, while the flange 8 of the intermediate body structural element 3 is bent inward so that the flanges 8 and 9 may be brought into surface-to-surface contact.

The intermediate body structural element 3 has ribs 11 formed on an inner wall of each of the rear fender inners 6F in contact with the flange 8 for transferring the impact acting on the rear body structural element 4 upon occurrence of a rear-end collision of the vehicle into an inplane pressure exerted on the rear fender inner 6F.

Figure 3:
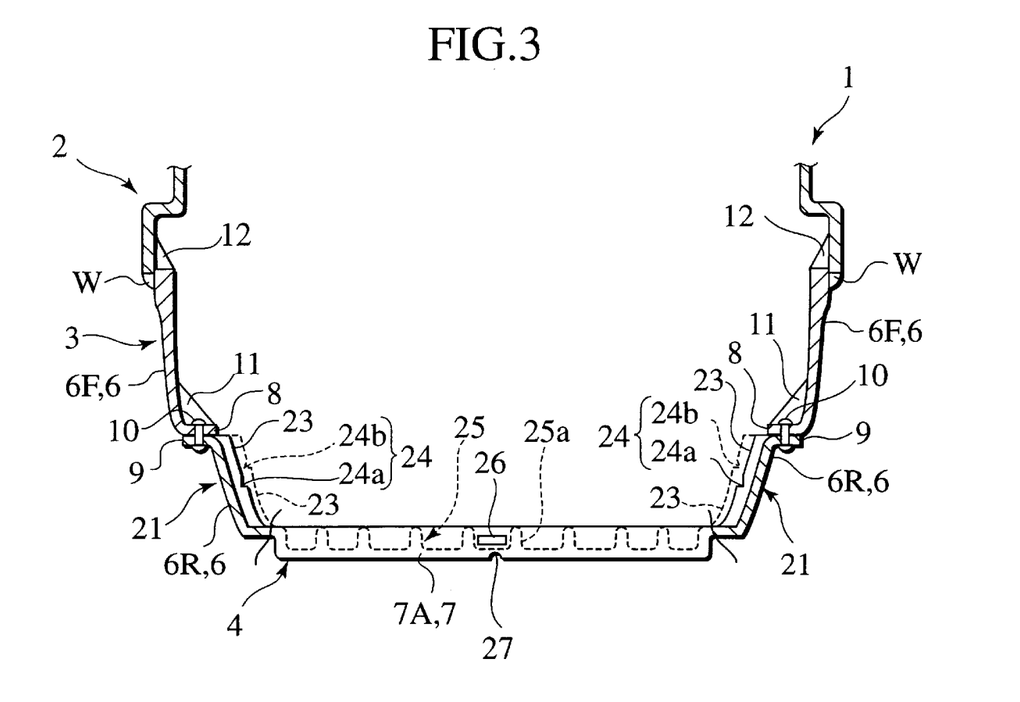
FIG. 3 is a lateral sectional view which shows a front body structural element, an intermediate body structural element, and a rear body structural element of a rear body.

The intermediate body structural element 3 is, as clearly shown in FIG. 3, lapped partially in the front body structural element 2 and welded as indicated at W.

The intermediate body structural element 3 is, as described above, smaller in wall thickness than the front body structural element 2 as a whole, however, it has a thick end portion welded to the front body structural element 2 whose thickness is substantially equal to that of the front body structural element 2 for increasing the strength of connection between the intermediate body structural element 3 and the front body structural element 2.

The front body structural element 2 has a plurality of ribs 12 formed integrally on an inner wall thereof which are in contact with the end of the intermediate body structural element 3 when the front body structural element 2 and the intermediate body structural element 3 are joined together, thereby transferring the collision impact transmitted from the intermediate body structural element 3 into an inplane pressure acting on the front body structural element 2. The ribs 12 also work as stoppers which assist in positioning the front body structural element 2 longitudinally when joined to the intermediate body structural element 3.

The rear body structural element 4 has formed in each of the rear fender inners 6R an easy-to-deform portion 21 which serves to facilitate a collapse of the rear fender inner 6R in response to input of the impact produced by the rear-end collision of the vehicle.

Each of the easy-to-deform portions 21 has V-shaped grooves 22 formed at given vertical intervals in an outer wall of one of the rear fender inner 6R bulging outward along a vertical car line. The grooves 22 extend longitudinally of the vehicle body and define ridges 23 on an inner wall of each of the rear fender inners 6R. Each of the ridges 23 has a notch 24 formed in the longitudinal center thereof which serves to induce a corresponding one of the rear fender inners 6R to be collapsed easily so that the grooves 22 may be opened vertically when the vehicle is involved in a rear-end collision.

The grooves 22 extend from the flange 9 of each of the rear fender inners 6R to the rear end of the rear fender inner 6R. Each of the notches 24 also serves as a step with which an end of an ejector pin (not shown) engages when the rear body structural element 4 is withdrawn (in a longitudinal direction of the vehicle body in the drawing) from a mold in a casting process.

Two of the notches 24 which are, as indicated at 24a in FIG. 3, formed in the ridges 23 of each of the rear fender inners 6R located outward in a width-wise direction of the vehicle body are offset rearward of two of the notches 24, as indicated at 24b, located inward in the width-wise direction of the vehicle body.

The rear end panel 7 has an upper half which extends in the width-wise direction of the vehicle body and bulges outward to define a trunk lid receiver 7A and a lower half which bulges inward and has side member mounts 7B formed on ends thereof.

Figure 2:
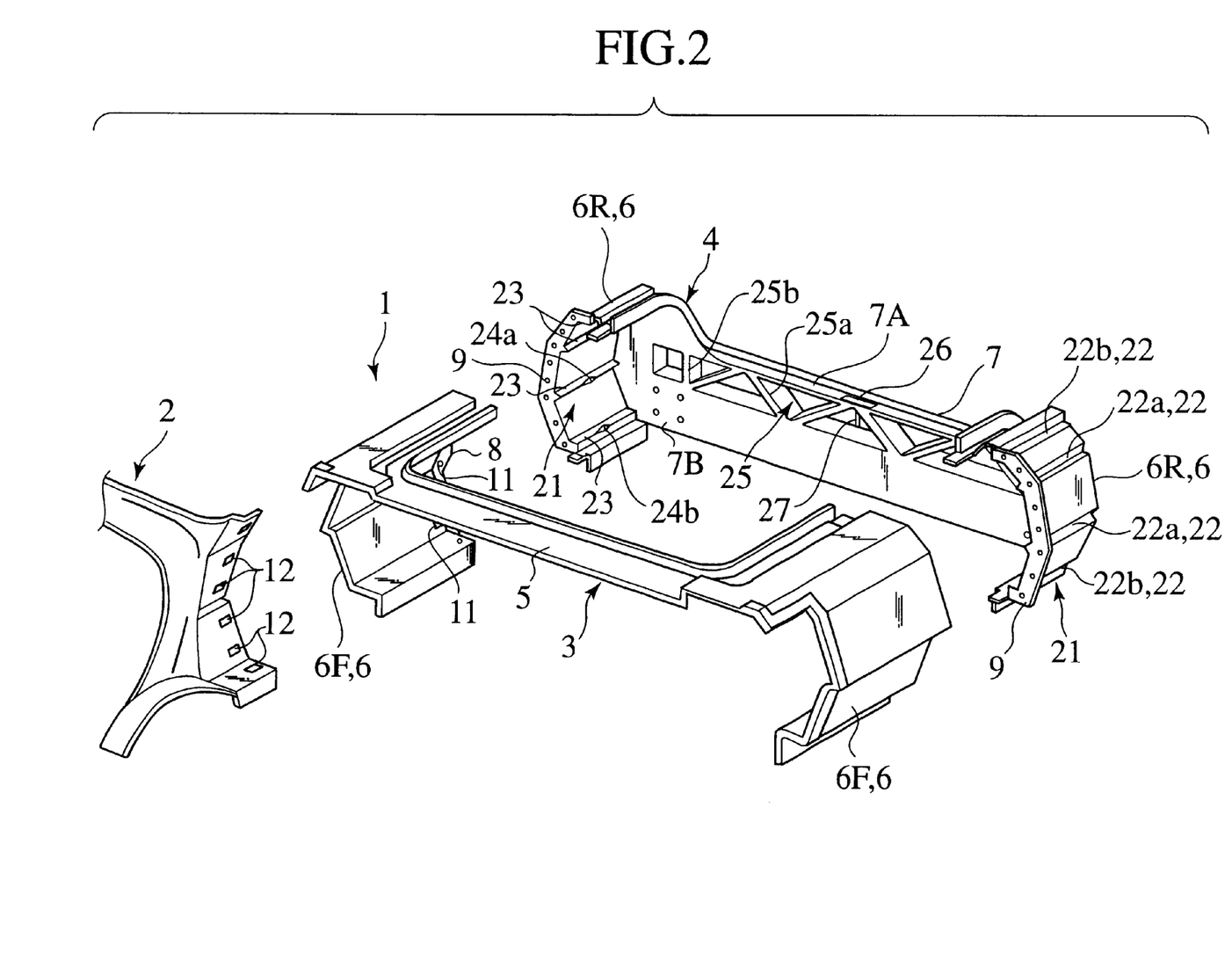
FIG. 2 is an exploded perspective view which shows a rear body according to the first embodiment of the invention.

The trunk lid receiver 7A has, as clearly shown in FIG. 2, a load transmitting means 25 formed over a length thereof which works to transmit a rear-end collision impact force to the rear fender inners 6. The load transmitting means 25 is made up of diagonal ribs 25a and vertical ribs 25b provided within a recess formed in an inner wall of the trunk lid receiver 7A. The diagonal ribs 25a extend in a wave form within the trunk lid receiver 7A between the side member mounts 7B. The vertical ribs 25b are arranged outside the diagonal ribs 25a.

The trunk lid receiver 7A has formed in a central portion of an upper surface thereof a striker receiver 26 into which a striker of a lock mechanism of a trunk (not shown) is fitted. The trunk lid receiver 7A also has a upright bead 27 which is formed by bulging a central portion of a rear wall thereof inward as serving as a fragile portion.

To the inside wall of the side member mounts 7B of the rear body structural element 4, side members (not shown) are joined, while to the outside wall thereof, member extensions (not shown) are joined in alignment with the side members. Each of the side member mounts 7B has, as shown in FIG. 1, a vertical rib 28 which is formed on the outside wall thereof and extends up to an outer bottom wall of the trunk lid receiver 7A for increasing the rigidity thereof.

As described above, the rear body 1 is made up of three cast parts: the front body structural element 2, the intermediate body structural element 3, and the rear body structural element 4 which are arrayed longitudinally of the vehicle body. The wall thickness of the rear body 1 increases from the rear body structural element 4 to the intermediate body structural element 3 and to the front body structural element 2, and the rear body structural element 4 decreases in lateral cross section gradually, thereby increasing the rigidity of the rear body 1 from the rear body structural element 4 to the front body structural element 2. This induces the rear body 1 to be collapsed in the order of the rear body structural element 4, the intermediate body structural element 3, and the front body structural element 2 when the vehicle is involved in a rear-end collision of the vehicle. Specifically, the rear body 1 absorbs the energy of collision impact as a whole a s well as the absorption by lower portions of the rear side members.

The rigidity of the rear body 1, as described above, increases from the rear body structural element 4 to the intermediate body structural element 3 and to the front body structural element 2, that is, as approaching the vehicle cabin. Specifically, the rear body 1 is so designed as to have the greatest resistance to the collapse caused by a rear-end collision in the front body structural element 2 and induce the rear body structural element 4 to be collapsed easily, thereby minimizing the amount of collapse of the front body structural element 2 and the intermediate body structural element 3 to provide a protective structural area as great as possible to the front of the rear body 1 close to the vehicle cabin.

In the event of a light rear-end collision, only the rear body structural element 4 is collapsed, which allows the rear body 1 to be reconditioned only by fixing or replacing the rear body structural element 4. Particularly, the rear body structural element 4 and the intermediate body structural element 3 are joined by connecting the flanges 9 and 8 using the fastening members 10, thus allowing the rear body structural element 4 to be replaced easily only by removing the fastening member 10 from the flanges 8 and 9.

Further, the joining of the rear body structural element 4 and the intermediate body structural element 3 using the flanges 9 and 8 increases the degree of transmission of the rear-end collision impact force from the rear body structural element 4 to the front body structural element 2 through the intermediate body structural element 3 and also ensures a higher resistance of the rear body structural element 4 to the collapse.

The rear body structural element 4, as described above, has formed in each of the rear fender inners 6R the easy-to-deform portion 21 serving to facilitate a collapse of the rear fender inner 6R in response to an impact force produced by the rear-end collision of the vehicle. Additionally, the trunk lid receiver 7A of the rear end panel 7 has the load transmitting means 25 which works to transmit the rear-end collision impact force to the rear fender inners 6. The rear-end collision impact force is, thus, transmitted to the right and left rear fender inners 6R effectively to induce the collapse of the rear fender inners 6R from the easy-to-deform portions 21, thereby resulting in collapse of the rear body structural element 4 in an optimum deformation mode.

Figure 4:
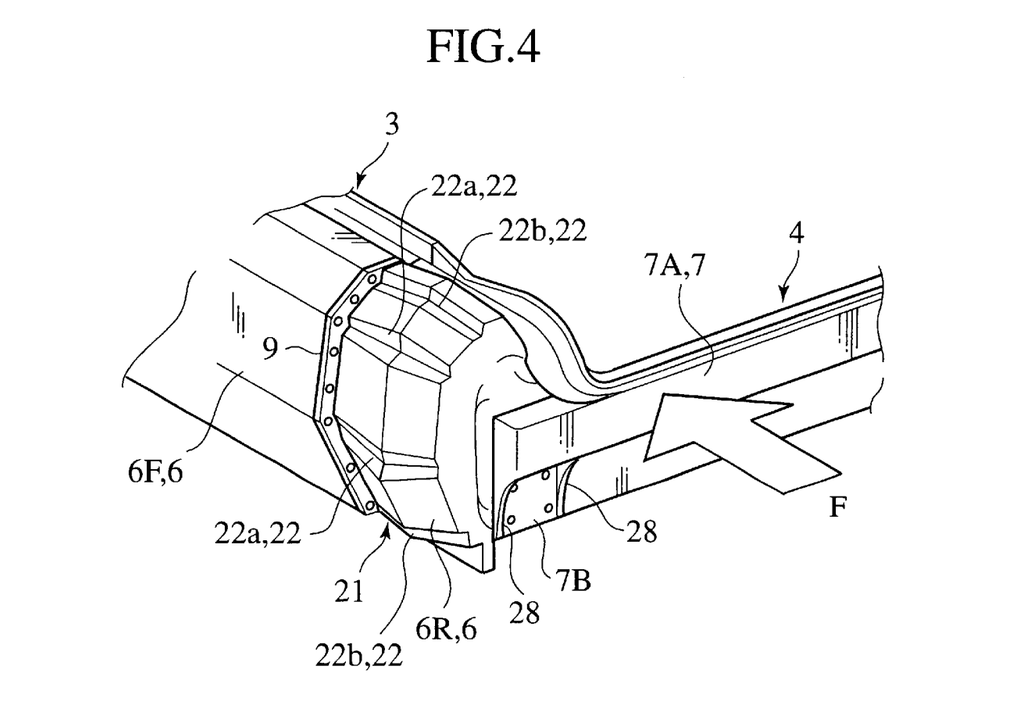
FIG. 4 is a perspective view which shows a collapse of a rear fender inner in response to input of a collision impact force.

Each of the easy-to-deform portions 21 has the V-shaped grooves 22 extending in parallel at a given vertical interval and the notches 24 formed in the central portions of the ridges 23 defined by the grooves 22 so that the rear fender inners 6R may be bent inward at the notches 24 upon input of the rear-end collision impact force, causing the grooves 23 to be opened vertically. Specifically, the collapse of each of the rear fender inners 6R includes, as shown in FIG. 4, the vertical deformation of the grooves 22 and an outward bulge thereof, thereby absorbing the energy of the rear-end collision impact effectively.

Figure 5:
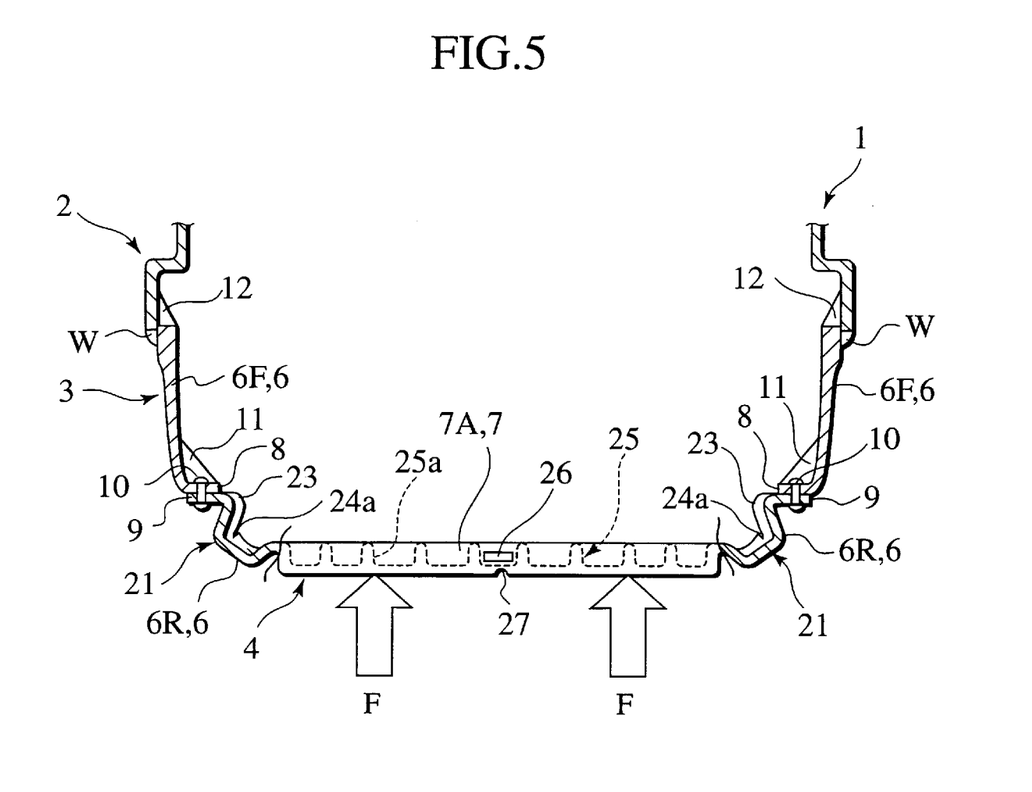
FIG. 5 is a lateral sectional view which shows a collapse of rear fender inners when a vehicle is involved in a full lap rear-end collision.

For example, when the vehicle is involved in the so-called full lap collision in which an impact force F, as shown in FIG. 5, acts on the rear end panel 7 from a perpendicular direction, the impact force F is distributed equally to the right and left rear fender inners 6R through the load transmitting means 25, so that the stress concentrates at the notches 24 formed in the ridges 23 of the easy-to-deform portions 21, thereby causing the rear fender inners 6R to bulge outward at the notches 24 and the grooves 22 to be opened vertically.

The notches 24a which are formed in the ridges 23 defined by the grooves 22a located outward of the vehicle body are, as described above, offset rearward of the notches 24b formed on the ridges 23 defined by the grooves 22b located inward of the vehicle body, thereby causing an outward bulging portion of each of the rear fender inners 6R which is difficult to deform to be collapsed earlier so that the rear fender inners 6R are collapsed in a desired mode.

Additionally, the longitudinal offset of the notches 24a and 24b avoids the interference of the vertical deformation of the grooves 22a with that of the grooves 22b, thereby enhancing the efficiency in absorbing the energy of collision impact.

Figure 6:
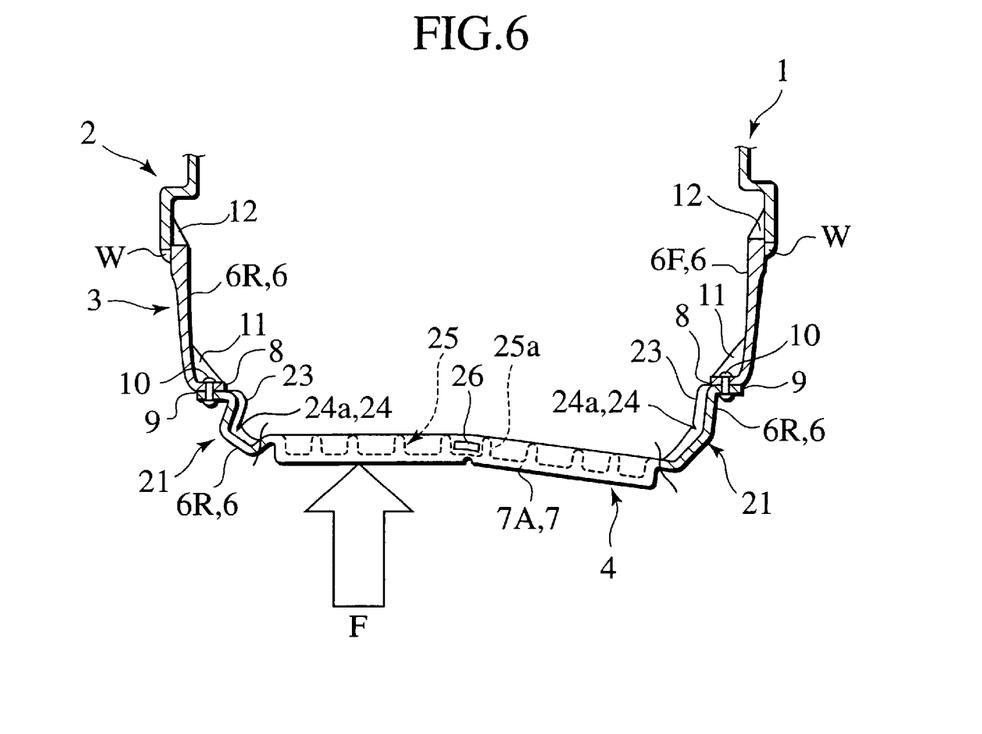
FIG. 6 is a lateral sectional view which shows a collapse of a rear fender inner when an impact force is applied to a half of a rear end panel.
Figure 7:
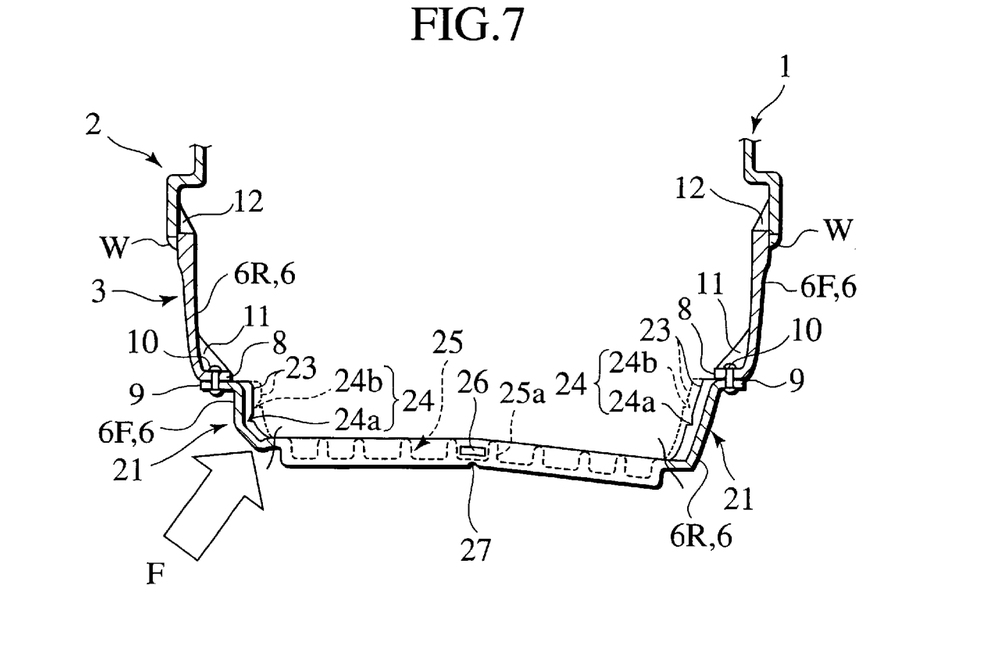
FIG. 7 is a lateral sectional view which shows a collapse of a rear fender inner when an impact force is applied to a half of a rear end panel from a diagonal direction.

FIG. 6 shows a collapse of the rear end panel 7 when the vehicle is involved in the so-called offset rear-end collision in which the impact force F is applied to a half of the rear end panel 7 from a perpendicular direction. In this case, the impact force F acts only on one of the rear fender inners 6R located on the collision side, but the bead 27 extending vertically in the central portion of the rear end panel 7 works as a fragile portion to induce the rear end panel 7 to be bent at the center thereof, so that the impact force F is transmitted as the moment of force to the other rear fender inner 6R on the non-collision side. This causes the rear fender inner 6R on the non-collision side to be collapsed through the easy-to-deform portion 21, thereby absorbing the impact force F completely. Substantially the same collapse of the rear end panel 7 is also taken place when the impact force F acts, as shown in FIG. 7, on the rear end panel 7 from a diagonal direction.

Figure 8:
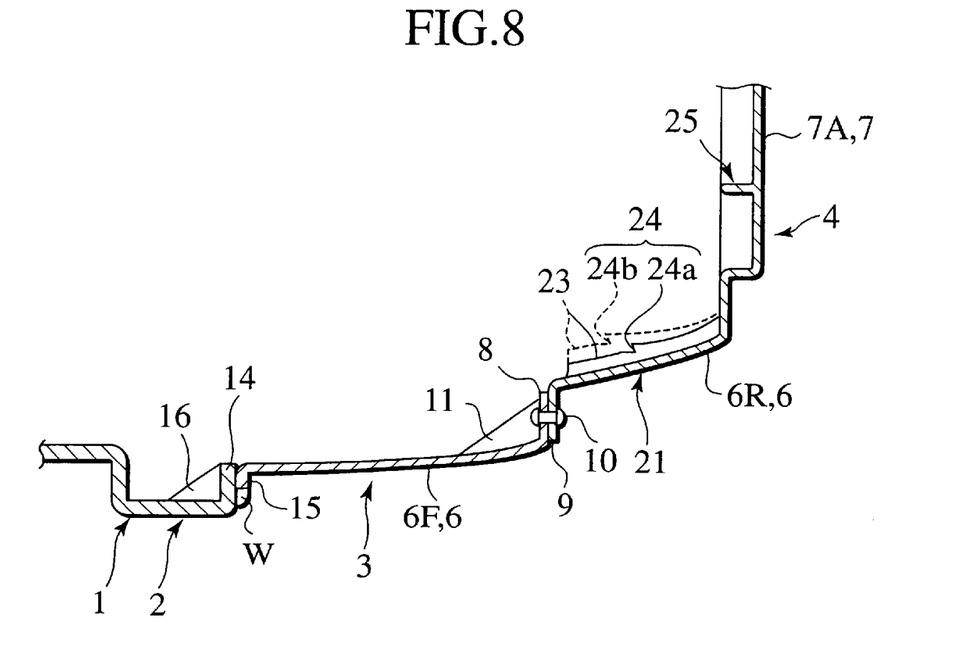
FIG. 8 is a partial sectional view which shows a rear body according to the second embodiment of the invention.

FIG. 8 shows the rear body 1 according to the second embodiment of the invention which is different from the first embodiment in a connection of the front body structural element 2 and the intermediate body structural element 3. Other arrangement are identical, and explanation thereof in detail will be omitted here.

The front body structural element 2 has a flange 14 bent inward. The intermediate body structural element 3 has a flange 15 bent outward. The front body structural element 2 and the intermediate body structural element 3 are jointed by welding the flange 15 on the flange 14, as indicated at W. A plurality of ribs 16 are formed on an inner corner of the flange 14 to transfer an impact force produced by a rear-end collision of the vehicle into an inplane pressure acting on the front body structural element 2.

Figure 9:
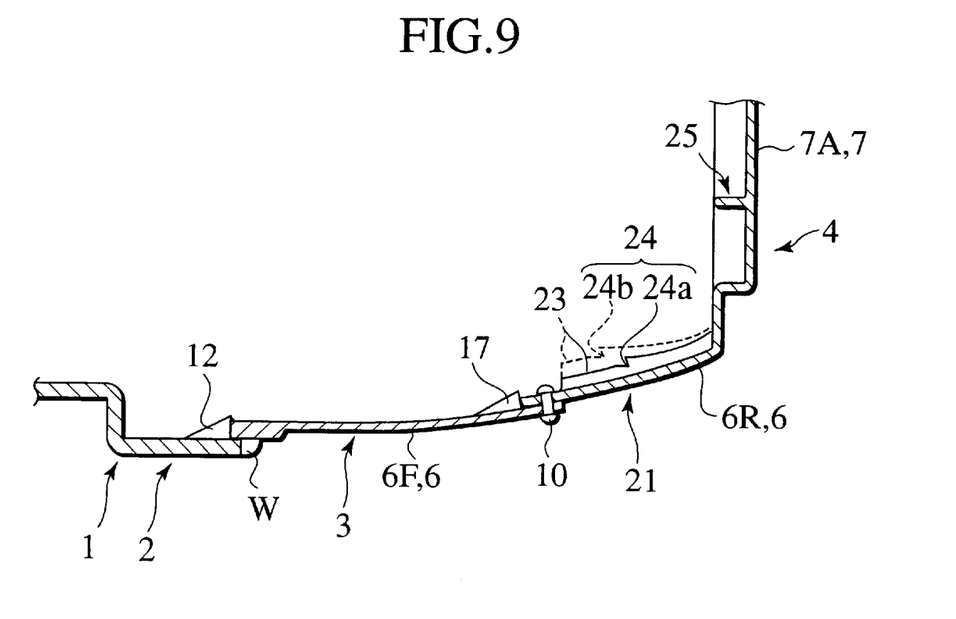
FIG. 9 is a partial sectional view which shows a rear body according to the third embodiment of the invention.

FIG. 9 shows the rear body 1 according to the third embodiment of the invention which is different from the first embodiment in a connection of the intermediate body structural element 3 and the rear body structural element 4. Other arrangement are identical, and explanation thereof in detail will be omitted here.

The rear body structural element 4 is lapped at an end portion thereof over the intermediate body structural element 3 and joined together by fastening members 10 such as rivets.

A plurality of ribs 17 are formed integrally on an inner wall of the intermediate body structural element 3 which are in contact with an end of the rear body structural element 4 when the intermediate body structural element 3 is joined to the rear body structural element 4 for transferring a rear-end collision impact force exerted on the rear body structural element 4 into an inplane pressure acting on the intermediate body structural element 3. The ribs 17 also serve as stoppers for positioning the rear body structural element 4 when fitted into the intermediate body structural element 3.

Figure 10:
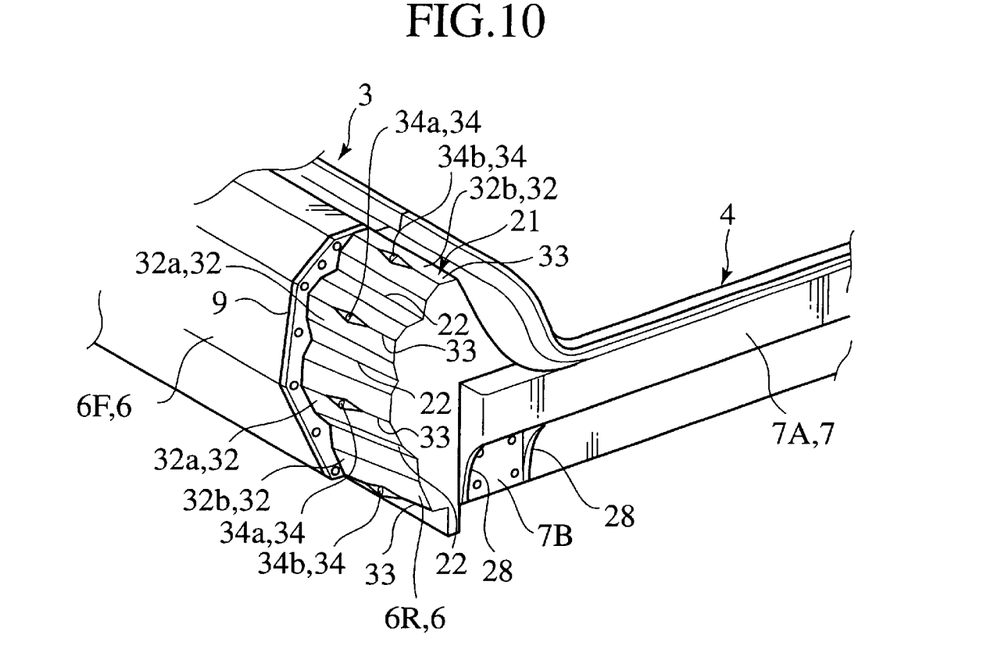
FIGS. 10 and 11 are partial perspective views which show a modified form of an easy-to-deform portion of each rear fender inner of a rear body structural element 4.
Figure 11:
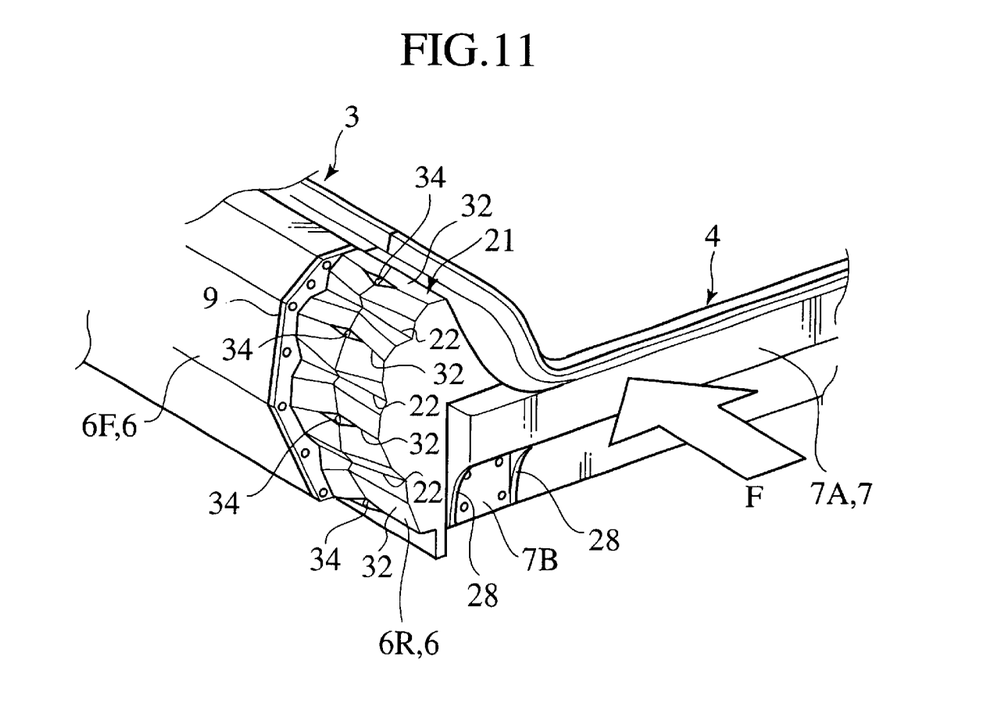

FIGS. 10 and 11 show a modification of the easy-to-deform portion 21 of each of the rear fender inners 6R of the rear body structural element 4.

The easy-to-deform portion 21 is made of a wall which is corrugated to define V-shaped troughs 22 and peaks 32 extending horizontally and which bulges, like the first embodiment, outward as a whole along a vertical car line of the rear fender inner 6R. The V-shaped troughs 22 have substantially the same length as that of the grooves 22 in the first embodiment. Each of the peaks 32 has a notch 34 formed in a central portion of the ridge 33 for inducing the rear fender inner 6R to be collapsed easily at the notches 34 when a rear-end collision impact force F, as shown in FIG. 11, is applied to the rear end panel 7.

Two of the notches 34, as indicated at 34a, which are formed in the peaks 32a located outward in the width-wise direction of the vehicle body are offset, like the first embodiment, rearward of two of the notches 34, as indicated at 34b, located inward in the width-wise direction of the vehicle body, thereby causing an outmost portion of each of the rear fender inners 6R to be collapsed earlier so that the rear fender inner 6R is collapsed in a desired mode.

Additionally, the longitudinal offset of the notches 34a and 34b also serves to avoid the interference of inward bends of the outer peaks 32a at the notches 34a with those of the inner peaks 32b at the notches 34b, thereby enhancing the efficiency in absorbing the energy of collision impact.

Notches, like the first embodiment, may also be formed in the inner wall (i.e., the troughs 22) of the rear fender inners 6R.

As apparent from the above discussion, the structure of the rear body 1 is so designed as to facilitate the ease of collapse of a rear portion thereof (i.e., the rear body structural element 4) for absorbing the energy of a collision impact force acting on the rear of the vehicle body in an ideal mode to provide an occupant protective area on the front side of the rear body 1. Further, the rear body 1 is fabricated by three cast parts: the front body structural element 2, the intermediate body structural element 3, and the rear body structural element 4, thus decreasing the number of parts and production processes greatly as compared with a conventional structure of a rear body made by assembling many panel members. The assembly of the vehicle body may be accomplished by preparing a subassembly made up of the body structural elements 2, 3, and 4 and then joining it to a front body, thereby facilitating the ease of automatic assembly of the vehicle body and resulting in a decrease in manufacturing cost.

The rear body 1 may alternatively be made up of two separate cast parts: one being an one-piece structural member including the front body structural element 2 and the intermediate body structural element 2 integrally and the other being the rear body structural element 4.

The entire contents of Japanese Patent Application No. 2000-66534 (filed on Mar. 10, 2000) is incorporated herein by reference.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A rear body of an automotive vehicle comprising:
   a front body structural element made of a cast defining a front portion of the rear body;
   a rear body structural element made of a cast, said rear body structural element being joined to said front body structural element to define a rear portion of the rear body and having a rigidity smaller than that of said front body structural element; and
   an intermediate body structural element joined between said front body structural element and said rear body structural element, and wherein said front body structural element defines body side inners, said intermediate body structural element includes a rear parcel and front portions of rear fender inners, and said rear body structural element includes rear portions of the rear fender inners and a rear end panel, and wherein a rigidity of the rear body increases gradually from said rear body structural element to said front body structural element through said intermediate body structural element.

2. A rear body as set forth in claim 1, wherein said intermediate body structural element has flanges formed on the front portions of the rear fender inners, and said rear body structural element has flanges formed on the rear portions of the rear fender inners, and wherein said intermediate body structural element and said rear body structural element are joined together by connecting the flanges using a given fastening member.

3. A rear body as set forth in claim 2, further comprising ridges connecting with the flange.

4. A rear body as set forth in claim 1, wherein said rear body structural element has provided in the front portions of the rear fender inners easy-to-deform portions which serve to facilitate ease of a collapse of the front portions of the rear fender inners in response to input of an impact force produced by a rear-end collision of the vehicle.

5. A rear body as set forth in claim as set forth in claim 4, wherein each of said easy-to-deform portions has a wall of the front portion of one of the rear fender inners which bulges outward along a vertical car line of the rear fender inner and is waved to define troughs and ridges extending longitudinally of the rear body, each of the ridges having formed in a central portion of a length thereof a fragile portion which serves to induce a corresponding one of the front portions of the rear fender inners to be bent thereat in one of an inward and an outward direction in response to input of an impact force produced by a rear-end collision of the vehicle.

6. A rear body as set forth in claim 5, wherein at least one of the fragile portions located outward of the rear body is offset rearward of the fragile portions located inward of the rear body.

7. A rear body as set forth in claim 4, wherein the rear end panel has a load transmitting portion extending in a widthwise direction of the rear body for transmitting the impact force produced by the rear-end collision of the vehicle to the rear fender inners.

8. A rear body as set forth in claim 7, wherein the rear end panel has a vertically extending fragile portion formed in a central portion thereof in a width-wise direction of the rear body.

9. A rear body as set forth in claim 1, wherein the rear body structural element comprises an energy absorbing portion for absorbing an energy of collision impact.

10. A rear body as set forth in claim 9, wherein the energy absorbing portion comprises an easy-to-deform portion.

11. A rear body as set forth in claim 10, wherein the easy-to-deform portion comprises rigid portions and a fragile portion between the rigid portions.

12. A rear body as set forth in claim 11, wherein the fragile portion serves as a pin engage portion when the rear body structural element is withdrawn from a mold in a casting process.

13. A rear body as set forth in claim 1, wherein the rigidity is changed by changing a wall thickness.

14. A rear body of an automotive vehicle comprising:
   a front body structural element made of a cast defining a front portion of the rear body;
   a rear body structural element made of a cast and including a rear fender inner and a rear end panel, said rear body structural element being joined to said front body structural element to define a rear portion of the rear body; and
   an intermediate body structural element made of a cast defining an intermediate portion of the rear body, wherein
      said intermediate body structural element is joined between said front body structural element and said rear body structural element,
      said rear body structural element has a rigidity that is smaller than that of said front body structural element,
      the rigidity of said rear body structural element is controlled by a wall thickness or a wall configuration of the rear body,
      the rear body structural element comprises an energy absorbing portion for absorbing an energy of collision impact,
      the energy absorbing portion comprises an easy-to-deform portion that includes a fragile portion, and the fragile portion is disposed on the rear fender inner and the rear end panel.

15. A rear body of an automotive vehicle comprising:

a front body structural element made of a cast defining a front portion of the rear body;

a rear body structural element made of a cast, said rear body structural element being joined to said front body structural element to define a rear portion of the rear body; and an intermediate body structural element made of a cast defining an intermediate portion of the rear body, wherein said intermediate body structural element is joined between said front body structural element and said rear body structural element, said rear body structural element has a rigidity that is smaller than that of said front body structural element, the rigidity of said rear body structural element is controlled by a wall thickness or a wall configuration of the rear body, the rear body structural element comprises an energy absorbing portion for absorbing an energy of collision impact, the energy absorbing portion comprises an easy-to-deform portion, the easy-to-deform portion comprises rigid portions and a fragile portion between the rigid portions, and the fragile portion comprises a notch and the rigid portions comprise a ridge.

16. A rear body of an automotive vehicle comprising:

a front body structural means for defining a front portion of the rear body;

a rear body structural means for defining a rear portion of the rear body, said rear body structural means being joined to said front body structural means and said rear portion of the rear body having a rigidity smaller than that of said front body structural means; and an intermediate body structural means for joining between said front body structural means and said rear body structural means, wherein said front body structural means defines body side inners, said intermediate body structural means includes a rear parcel and front portions of rear fender inners, said rear body structural means includes rear portions of the rear fender inners and a rear end panel, and a rigidity of the rear body increases gradually from said rear body structural means to said front body structural means through said intermediate body structural means.

* * * * *